US012646381B1

(12) United States Patent
Krause et al.

(10) Patent No.: US 12,646,381 B1
(45) Date of Patent: Jun. 2, 2026

(54) WAGERING GAME METHOD, SYSTEM AND DEVICE

(71) Applicants: Lawrence Krause, Kenosha, WI (US); Gary Armentrout, Las Vegas, NV (US)

(72) Inventors: Lawrence Krause, Kenosha, WI (US); Gary Armentrout, Las Vegas, NV (US)

( * ) Notice: Subject to any disclaimer, the term of this patent is extended or adjusted under 35 U.S.C. 154(b) by 313 days.

(21) Appl. No.: 18/244,105

(22) Filed: Sep. 8, 2023

Related U.S. Application Data

(60) Provisional application No. 63/404,724, filed on Sep. 8, 2022.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3288* (2013.01); *G07F 17/3211* (2013.01)

(58) Field of Classification Search
CPC ... G07F 17/32; G07F 17/3214; G07F 17/3222
USPC .............................. 463/1, 20, 22, 25, 30, 39
See application file for complete search history.

(56) References Cited

U.S. PATENT DOCUMENTS

| | | | | |
|---|---|---|---|---|
| 7,520,507 B2 * | 4/2009 | Gak | A63F 3/00157 273/274 |
| 7,654,530 B2 * | 2/2010 | Smith | A63F 3/00157 273/274 |
| 11,574,524 B2 * | 2/2023 | Strause | G07F 17/3244 |
| 2013/0225254 A1 * | 8/2013 | Pececnik | G07F 17/326 463/17 |

* cited by examiner

*Primary Examiner* — Adetokunbo O Torimiro
(74) *Attorney, Agent, or Firm* — Newman Law, LLC

(57) ABSTRACT

A random outcome generator is configured to randomly generate a round outcome consisting of numbers selected from a predefined number set. A positive subset, a neutral subset, and a negative subset are defined. At least one game wager is received. Rounds are conducted by randomly generating a round outcome and determining which of the positive set, neutral set, and negative set each of the numbers within the round outcome fall into. Rounds are terminated if a round outcome includes a number from the negative set. Any numbers within the positive set are stored and additional rounds are conducted until a final round has been conducted or a number within the round outcome falls within the negative set, whichever occurs first. Game wagers are resolved after the final round based on the numbers stored from the quantity of rounds plus any numbers selected in the final round.

6 Claims, 7 Drawing Sheets

WAGERING GAME METHOD, SYSTEM AND DEVICE

The present invention relates to a system, device, and method for a wagering game. More specifically, the present invention is directed to a system, method, and device using a random outcome generator to generate a set of numbers over one or more rounds, with the numbers determining the outcome of a wager based on the membership of the numbers within a positive set, neutral set, or negative set.

BACKGROUND OF THE INVENTION

Baccarat has enjoyed widespread popularity in Asia due in part to the fact that the winning results in this game are based on the numbers 8 and 9 which are highly valued within Asian cultures.

However as baccarat is a European game based on the original game of Chemin de Fer which dates back to the late 1400's, its massive popularity with Asian players after importation was purely accidental.

What baccarat lacks are numbers that have negative connotations in a numerology system, whether based on Asian numerology or other numerological systems.

Typically, dice games utilize dice to produce outcomes based on the sum of the values appearing on the selected dice faces rather than the numbers in and of themselves. For example, in the game of "Craps," the outcome of the two rolled dice is summed to arrive at a single outcome of a player's roll. Similarly, in Sic Bo, the total number of pips on the three dice is combined to determine a "small" number (3 through 18) or a "big" number (19 through 36). Face values in Sic Bo are only examined to determine if the faces of multiple dice match and any individual number is never determinative of the outcome in Sic Bo.

Many, if not most, cultures possess their own symbolism and beliefs about numbers. Lucky numbers and unlucky numbers are common in many cultures, although these numbers are frequently not used to create games.

For example, in Japan, seven and eight are considered the luckiest numbers. Although Lucky "7" (Nana) comes in part from Western culture, the Japanese also consider seven a lucky number and use it for a variety of occasions. "8" (Hachi) is thought of as "Suehirogari" from its shape which is described as widening toward the ends. Suehirogari is considered to become ever more prosperous as time goes on. In Japan, the numbers four (death) and, to a lesser degree, nine (torture or agony) are considered unlucky numbers.

As noted above, in China, lucky numbers include eight and nine. Unlucky numbers include four (death) and to a lesser degree, the number seven (related to ghosts).

Aside from lucky and unlucky numbers, East Asian numerology also includes Lo Shu Grid and its magic numbers which have numerical, ranking, and spatial qualities. The Five Elements (wood, fire, Earth, metal, water) also form the basis of a mystical system in Chinese culture.

It is noted that there is a lack in the art of wagering games of any wagering games that utilize and integrate numerological systems to produce winning outcomes for numerologically "lucky" numbers (or other positive symbols) and losing outcomes for numerologically "unlucky" numbers (or other negative symbols).

SUMMARY OF THE INVENTION

A method for conducting a wagering game utilizes a random outcome generator configured to randomly generate a round outcome consisting of numbers selected from a predefined number set. A positive set, a neutral set, and a negative set are defined. Each of the positive set, neutral set, and negative set consists essentially of numbers selected from the predefined number set, wherein all the numbers in the predefined number set are members of one, and only one, of the positive set, neutral set, or negative set.

At least one game wager is received. Optionally, the game wager is directed to the numbers generated by the random outcome generator over a quantity of rounds.

Rounds are conducted. A round consists of randomly generating a round outcome by the random outcome generator. A determination is made of which of the positive set, neutral set, and negative set each of the numbers within the round outcome fall into. The quantity of rounds is terminated if any of the numbers within the round outcome fall within the negative set, although in an optional embodiment, a neutral combination comprising a number from the negative set and at least one additional number may be defined and the quantity of rounds may be continued rather than terminated when the neutral combination occurs.

Any numbers within the positive set are stored and the quantity of numbers generated in the ensuing round outcome is reduced by the quantity of stored numbers. Additional rounds within the quantity of rounds are conducted until a final round of the quantity of rounds has been conducted or a number within the round outcome falls within the negative set, whichever occurs first, wherein in the additional rounds, the random outcome generator is configured to only reselect numbers falling within the neutral set. The game wagers are resolved after the final round based on the numbers stored from the quantity of rounds plus any numbers selected in the final round.

In a further optional embodiment, at least one round wager is received. Round wagers are resolved after each round based on the numbers within the round outcome.

DESCRIPTION

Reference is now made to the figures wherein like parts are referred to by like numerals throughout. Referring to FIGS. 1-6, the present invention includes a method, system, and device for conducting a wagering game. The present invention may be conducted as a live table game utilizing a live dealer and using physical random outcome generators, such as playing cards, tiles, dice, wheels, or the like. Alternatively, the present invention may be conducted as a live table game utilizing a live dealer and using an electronic random outcome generator, such as a computing device with a software, firmware, or hardware random number generator. In yet a further optional embodiment, the present invention may be conducted by an electronic device or system of electronic devices, in which a data processor conducts all the steps of the method by executing program instructions.

Regardless of the implementation of the method, a number set is defined. In an optional embodiment, the number set, which determines the possible outcomes that may be generated in the game, reflects positive and negative connotations associated with the range of possible outcomes. In one such optional embodiment, the number set is selected based on culturally-based numerology.

In one such optional embodiment, the number set is divided into subsets of "positive" sets of numbers, "neutral" sets of numbers, and "negative" sets of numbers. Outcomes and wagers are created consistent with the positive and negative connotations of the positive sets of numbers and negative sets of numbers, respectively.

For example, outcomes may be defined to employ the positive and negative characteristics of numbers arising from specific human cultures. It is contemplated that the number set as well as the positive, negative, and neutral subsets within the number set may be selected to accommodate the different number logic found in many different cultures thereby creating a game specifically tailored to those cultures and their numerological systems. Thus, the examples given below should be interpreted as illustrative rather than limiting since the numbers employed in the examples below may be interchanged or substituted with different numbers or symbols to create a customized game for the specific culture employing the substituted number logic or symbols.

Figure 1:
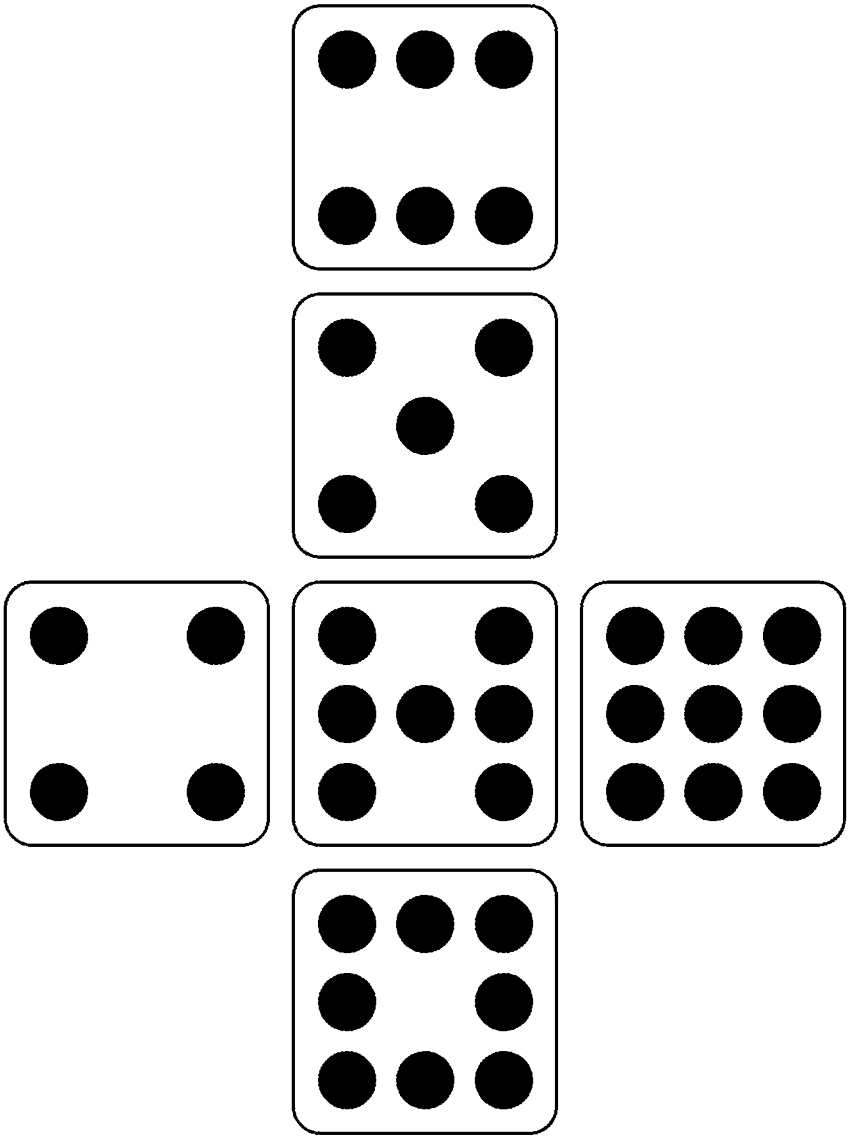
FIG. 1 is a plan view of a customized die for game play according to an embodiment of the present invention.

In an optional embodiment, a random outcome generator may produce a round outcome of three numbers randomly selected from the number set. As noted above, the numbers of a round outcome may be generated electronically, mechanically, or physically from a set of three six-sided dice (or electronic representations thereof). In an optional embodiment directed to Asian (and specifically, Chinese) numerology, the number set utilizes the numbers four through nine and, consequently, each die has faces numbered four through nine (as distinguished from a conventional die with faces numbered one through six) as illustrated in FIG. 1. In the optional embodiment of FIG. 1, the arrangement of the numbers of these dice place the numbers in a similar fashion to traditional dice with the lowest value (four) placed across a die from the highest value (nine), the second lowest value (five) placed across the die from the second highest value (eight), and the third lowest value (six) placed across the die from the third highest value (seven). In such an optional embodiment, the sum of the numbers on opposite sides of these customized dice always equals thirteen. It is contemplated the numbers may be represented on the die with traditional pips or with numerals.

The number set is divided into a positive set, a negative set, and a neutral set. In an optional embodiment directed to Chinese numerology, a positive set may include the numbers seven, eight, and nine, a negative set may include the number four, and a neutral set may include the numbers five and six. As may be appreciated, in such an optional embodiment, the number set is divided up with mutually exclusive positive, negative and neutral sets. Stated differently, in such an optional embodiment, each number of the number set is assigned to one, and only one, of the positive set, negative set, or neutral set.

In one optional embodiment, a game consists of a quantity of rounds. For example, in one optional embodiment, a game may consist of three rounds in which the random outcome generator produces a round outcome. More concretely, in one optional embodiment, a game consists of a round outcome, consisting of up to three numbers, generated up to three times.

In addition to the positive, negative, and neutral sets, certain combinations may also be defined. For example, in an optional embodiment, a neutral combination may be defined which counteracts the negative effect (described in greater detail below) of a number from the negative set. For example, in one optional embodiment, a negative number in a round outcome may result in termination of a game prior to completing all the rounds of the game. However, a neutral combination consisting of a number from the negative set in combination with another number, may be defined. If the number from the negative set appears in a round outcome in combination with a number that produces the neutral combination, the rounds may continue rather than terminate as would otherwise happen if the number from the negative set occurred outside of a neutral combination.

In one optional embodiment, wagers take one of three forms. In one optional embodiment, round wagers may be placed and resolved in each round based on the round outcome for that round. In an optional embodiment, game wagers may be placed prior to the first round and resolved after the final round of a game based on the game outcome consisting of numbers accumulated through the rounds (as described in greater detail below). In an optional embodiment, proposition wagers may be placed at any time, and may continue until a number from a negative set is produced in a round outcome, including being carried over multiple rounds and/or multiple games until either the combination wagered upon occurs in a round outcome, or a number from the negative set is generated, whichever occurs first.

Figure 2:
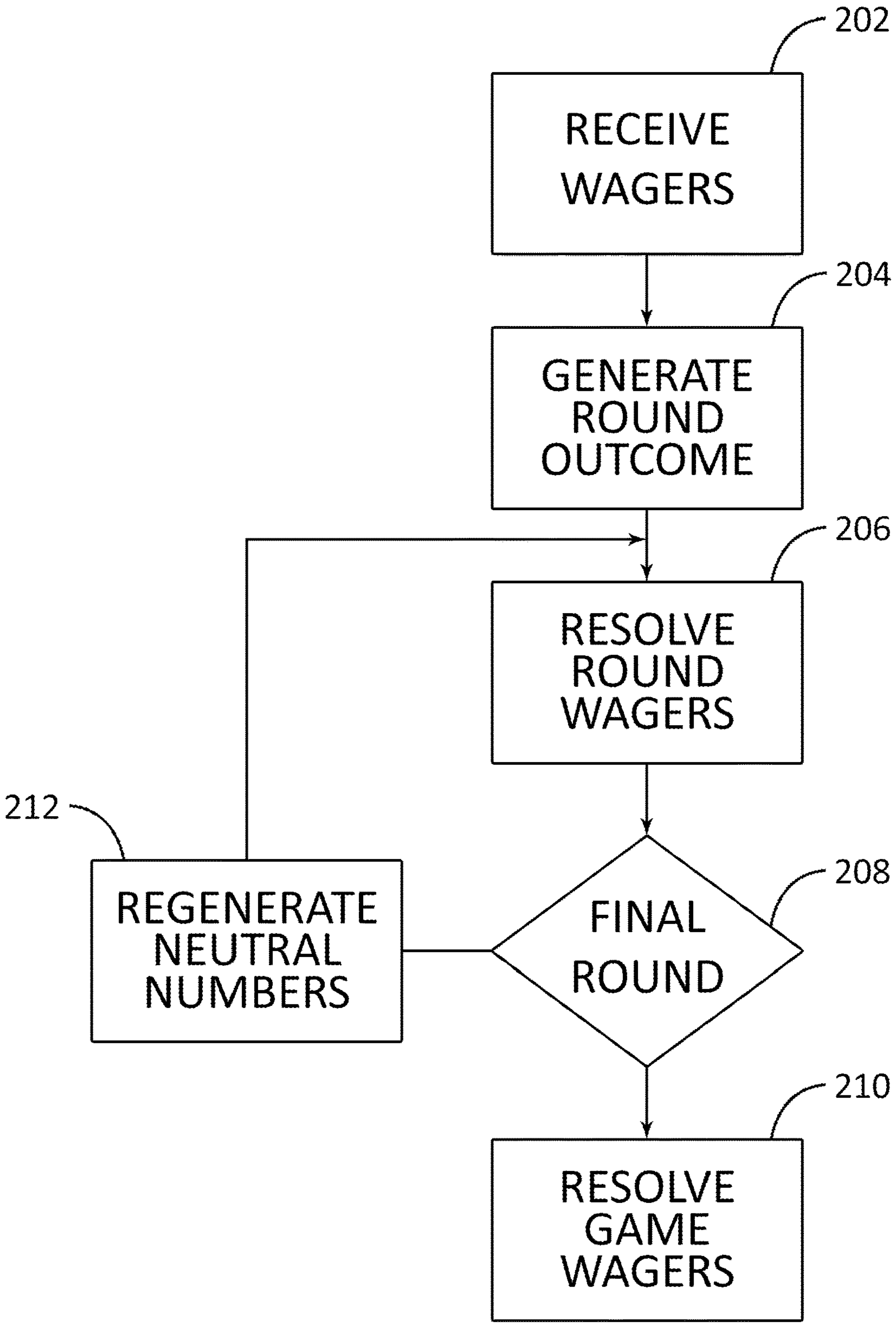
FIG. 2 is a flowchart of a method according to an embodiment of the present invention.

Referring to FIG. 2, in one optional embodiment, the method may be conducted by receiving 202 at least one game wager. As noted above, additional wagers such as round wagers and life wagers may also be offered. In an optional embodiment, any wagers are received only between (or at the commencement) of rounds.

In an optional embodiment, a game consists of up to three rounds, with each round including the random generation of a round outcome. The number of rounds may vary in other embodiments. In an optional embodiment, each round outcome includes the random generation of up to three numbers from the number set. In an optional embodiment, a game may end prior to the completion of three rounds if a combination of three numbers from the positive set are generated in one or more rounds or one of the numbers from the negative subset is generated in any one round. A game may continue over all three rounds so long as the round outcomes include at least one number from the neutral set.

A round outcome is generated 204 via the random outcome generator. In a first round, a round outcome may include, but is not limited to, three randomly and independently selected numbers from the number set. Numbers within the round outcome from the positive set are stored and the quantity of numbers generated in an ensuing round outcome is reduced by the quantity of stored numbers. Thus, in an optional embodiment using dice, any die displaying a number from the positive set is removed from play for subsequent rounds of the game.

In an optional embodiment including round wagers, round wagers are resolved 206 after each round based on the round outcome of the round in which the round wagers were placed. In one optional embodiment, round wagers are based on the individual numbers and combination of individual numbers of the round outcome, with round wagers rewarded when a round outcome matches the predicted numbers or combination of numbers and collected when a round outcome fails to match the predicted numbers or combination of numbers.

A determination is made 208 whether the final round has occurred. As described above, any round may be the final round either because a round outcome contained a number from the negative set (absent a neutral combination neutralizing the number from the negative set), or because the round outcome contained solely numbers from the positive set, or because the quantity of rounds has been conducted.

Game wagers are resolved 210 after a final round. Again, game wagers are collected if the predicted game outcome fails to occur and rewarded if the predicted game outcome occurs.

In some embodiments, if the round outcome included numbers from only the neutral and positive subsets, the round concludes, achieved wagers are paid and the player keeps the dice as no negative dice were included in the final roll of the round. In other embodiments, if one or more of a neutral subset occur in the final outcome, the roll is repeated until a final outcome is generated.

In some embodiments, some proposition wagers are resolved only in the rounds in which the predicted proposition occurs or rounds in which round outcome includes a number from the negative set. Stated another way, in such embodiments proposition wagers remain in play until the proposition wagered upon occurs or a number from the negative set is produced in a round outcome.

Figure 3:
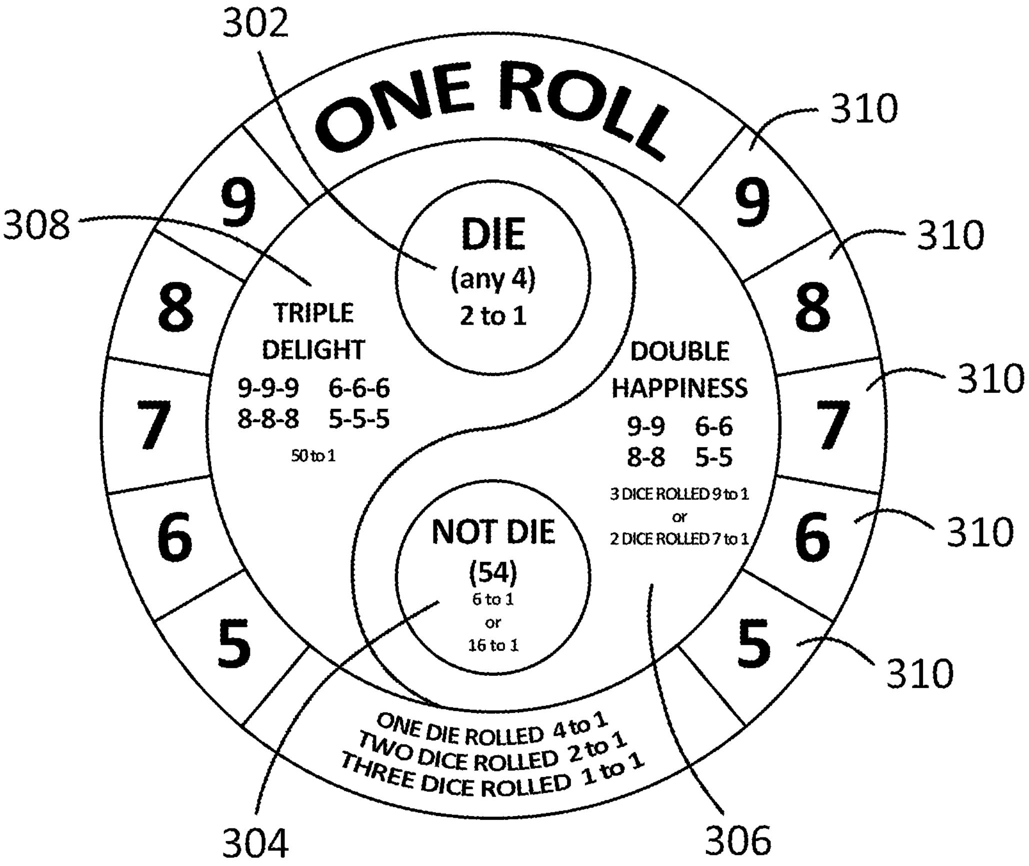
FIG. 3 is a top view of the first tier bet offerings according to an embodiment of the present invention.

An example of the wagers that may be offered in the present invention are illustrated in FIGS. 3-6 which illustrate a table layout where wagers may be placed in one optional embodiment. It is contemplated that the same, or substantially similar, wagers may be offered in different configurations than those illustrated in FIGS. 3-6 including, specifically, wagering options displayed on an electronic display device. Round wagers as shown in FIG. 3 are determined by the results of any round outcome generated by the random outcome generator. In the optional embodiment of FIG. 3, the round wagers are referred to as "Single Roll" bets as they are determined by a single roll of the dice. These wagers are placed prior to any round and resolved at the end of each round. The example of FIG. 3 is based on a number set containing the numbers four through nine, in which a positive set includes the numbers seven, eight, and nine, a negative set includes the number four, and a neutral set includes the numbers five and six. A neutral combination contains the number four in combination with the number five.

As illustrated in FIG. 3, the "Die" bet 302 pays when a four is generated with any numbers other than a five. Players are paid 2:1 on every generated four. The "Not Die" bet 304 pays when a five is generated with a four or two fours. This bet pays 6:1 with three active dice and double (2:1) with two active dice and 4:1 with one active die. The "Double Happiness" bet 306 pays when the round outcome is a pair of fives, sixes, eights, or nines with no four. This bet pays 6:1 with three active dice and 16:1 with two active dice. The "Triple Delight" bet 308 pays when the round outcome is triple fives, sixes, eights, or nines and it pays 50:1. Single number bets 310 can also be made that numbers five, six, seven, eight, or nine or any combination thereof will be generated without an unprotected four (a four without a five). These bets pays 1:1 on each achieved number with three active dice; 7:1 with two active dice; and 4:1 with one active die.

Figure 4:
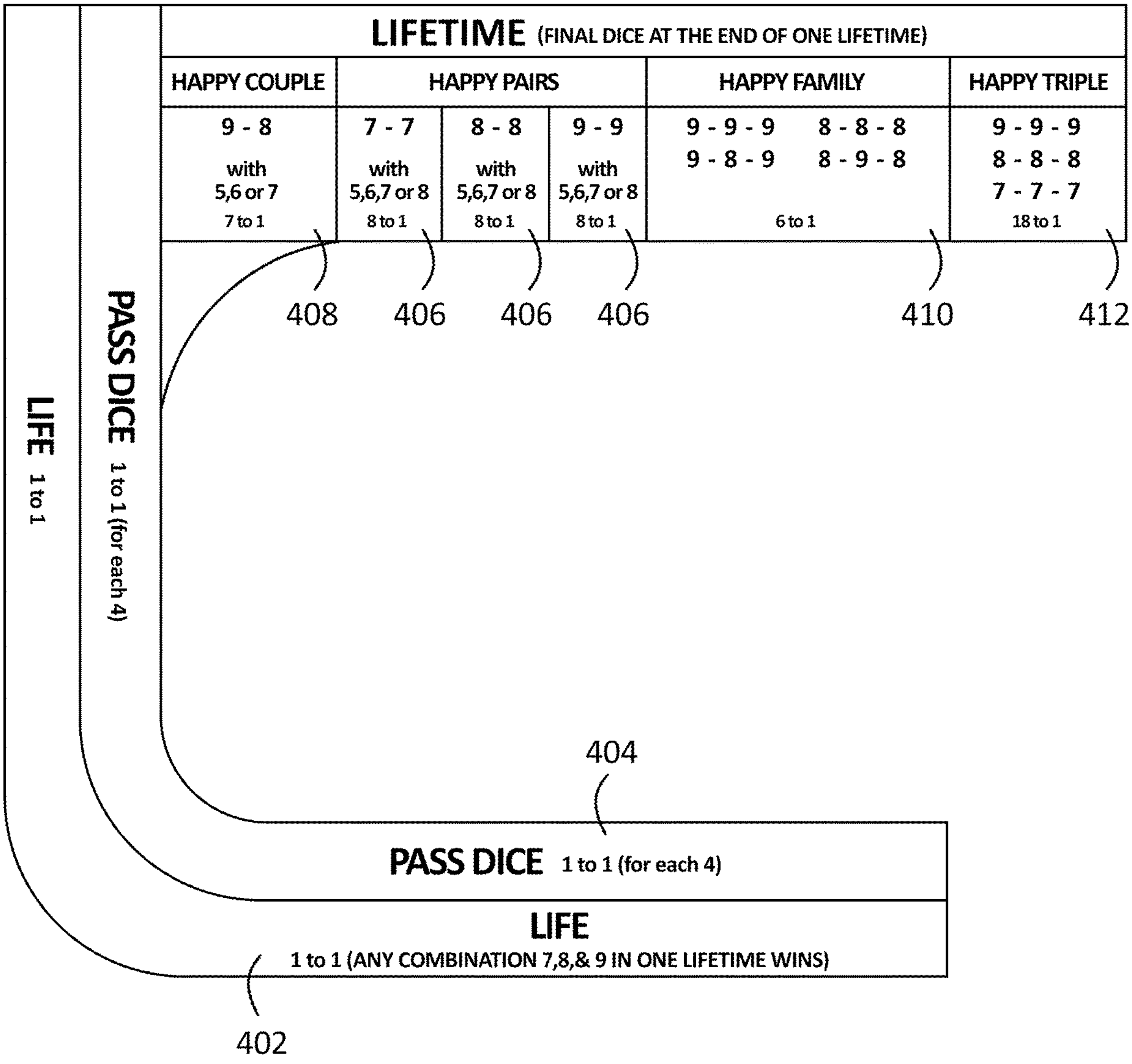
FIG. 4 is a top view of the second tier bet offerings according to an embodiment of the present invention.

Game wagers are as shown in FIG. 4 are resolved after a final round. In the optional embodiment of FIG. 4 game wagers are referred to as "Lifetime" bets as they relate to one complete game consisting of one or more rounds and terminating with a final round. The game wagers are resolved based on the stored numbers from the positive set plus any numbers from the positive or neutral set that occur in the final round. The "Life" bet 402 is successful when the stored numbers plus the final round outcome contain only numbers from the positive set, e.g., any combination of three dice showing seven, eight, or nine, without the appearance of any four in any round outcome. Life pays 1:1. The Life bet loses if any unprotected 4 (a 4 without a 5) is generated. If in a complete game, three rounds have been conducted and a set of three positive numbers, i.e., any combination of sevens, eights, and nines, has not been produced but a four has also not been produced, the Life bet pushes. The "Pass Dice" bet 404 is paid after a final round in which when a four is generated as long as a five is not generated in combination with the four. The Pass Dice bet pays 1:1. The "Happy Pairs" bet 406 is paid after a final round in which the dice display two sevens with any five, six, eight, or nine; two eights with any five, six, seven, or nine; or two nines with any five, six or seven, or eight. This bet pays 8:1 at the end of a final round. The "Happy Couples" bet 408 wins with an eight and a nine and any five, six, or seven and pays 7:1 at the end of a final round. The "Happy Family" bet wins with either three eights, three nines, two eights and a nine, or two nines and an eight and pays 6:1 at the end of a final round. The "Happy Triples" bet 412 wins with an exact match of three sevens, three eights, or three nines at the end of a final round and pays 18:1.

Figure 5:
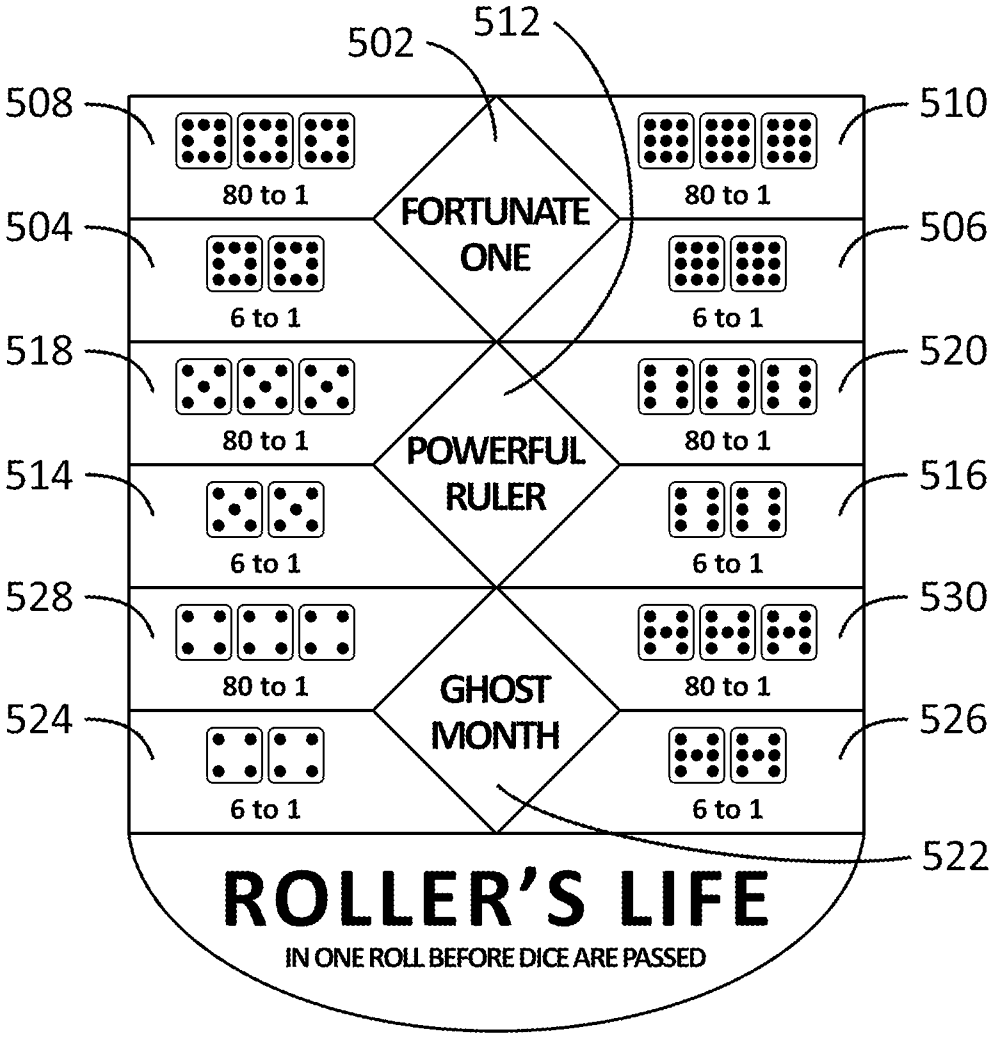
FIG. 5 is a top view of the third tier bet offerings according to an embodiment of the present invention.

Proposition wagers are illustrated in FIG. 5. Proposition wagers in this example are described as "Roller's Life" bets as they relate to the period of game play between placement of the bet and the generation of any unprotected four (a four without a five). These proposition wagers are resolved by the round outcome at the end of any round, with the bets being paid if the predicted combination occurs and collected if one or more dice display a four. If these bets are achieved, the bet may be removed, the payout taken, and a new proposition bet made. The "Fortunate One" bet 502 is a shared bet between any combination two eights, two nines, three eights, and three nines and pays 8:1 with either a pair of eights or nines or it pays 30:1 on either three eights or three nines with their occurrence in any single round outcome. Separate bets of two eights 504 and two nines 506 are placed under the Fortunate Ones bet and pay 50:1 with their occurrence in a single round outcome. Separate bets of three eights 508 and three nines 510 are placed under the Fortunate Ones bet and pay 90:1 with their occurrence in a single round outcome. The "Powerful Ruler" bet 512 is a shared bet between any combination two fives, two sixes, three fives, and three sixes and pays 8:1 with either a pair of fives or sixes or it pays 30:1 on either three fives or three sixes with their occurrence of any of the qualifying hands in a single round outcome. Separate bets of two fives 514 and two sixes 516 are placed under the Powerful Ruler bet and pay 50:1 with their occurrence in a single round outcome. Separate bets of three fives 518 and three sixes 520 are placed under the Powerful Ruler bet and pay 90:1 with their occurrence in a single round outcome. The "Ghost Month" bet 522 is a shared bet between any combination two fours, two sevens, three fours, and three sevens and pays 8:1 with either a pair of fours or sevens or it pays 30:1 on either three fours or three sevens with their occurrence in any single round outcome. Separate bets of two fours 524 and two sevens 526 are placed under the Ghost Month bet and pay 50:1 with their occurrence in a single round outcome. Separate bets of three fours 528 and three sevens 530 are placed under the Ghost bet and pay 90:1 with their occurrence in a single round outcome.

Additional bets may also be offered within the body of the game play or as designated side bets. For example, a bet referred to herein as the "NINE 8s Progressive Jackpot (888-888-888 Jackpot)" can be offered in which a percentage of the wager received is deposited into a metered progressive jackpot with 2 tiers, and a roller must score an "888" hand in three Lifetimes during that one (1) Roller's Life to win. After the first 888 is rolled, players at table can share the progressive by placing an extra "Nine 8s" bet, and if a third 888 hand is rolled, progressive jackpot is paid to Roller & table players split the second tier. Certain number combinations, such as 28, 38, 138, 168, 768 and 521, are considered particularly auspicious in Asian numerology and may be added as bets. As eight means prosperity in Chinese, twenty-eight means "double prosperity."

Thirty-eight is one of the luckiest pairs of numbers in Chinese numerology and is often called 'triple prosperity". 768 sounds like the phrase "fortune all the way" in Cantonese. In Mandarin, 168 means "road of prosperity" or "to be prosperous together". The Chinese consider this one of the luckiest sets of numbers. It has been used in many business names as 168 is considered to have significant power. 521 pronounced sounds similar to "I love you" and is also considered lucky. Multi-game bets can also be added to the bet offerings. A multi-game bet known as "3 Generations" wins when no round outcome contains a four for at least three games. Progressive jackpots can also be offered based on certain round outcomes and occurrences. The "888 Progressive Jackpot" could be devised and offered wherein a percentage of the game edge is deposited into a progressive jackpot displayed on a meter. The player can win the progressive jackpot by generating three eights in a complete game for three games without an unprotected four.

Figure 6:
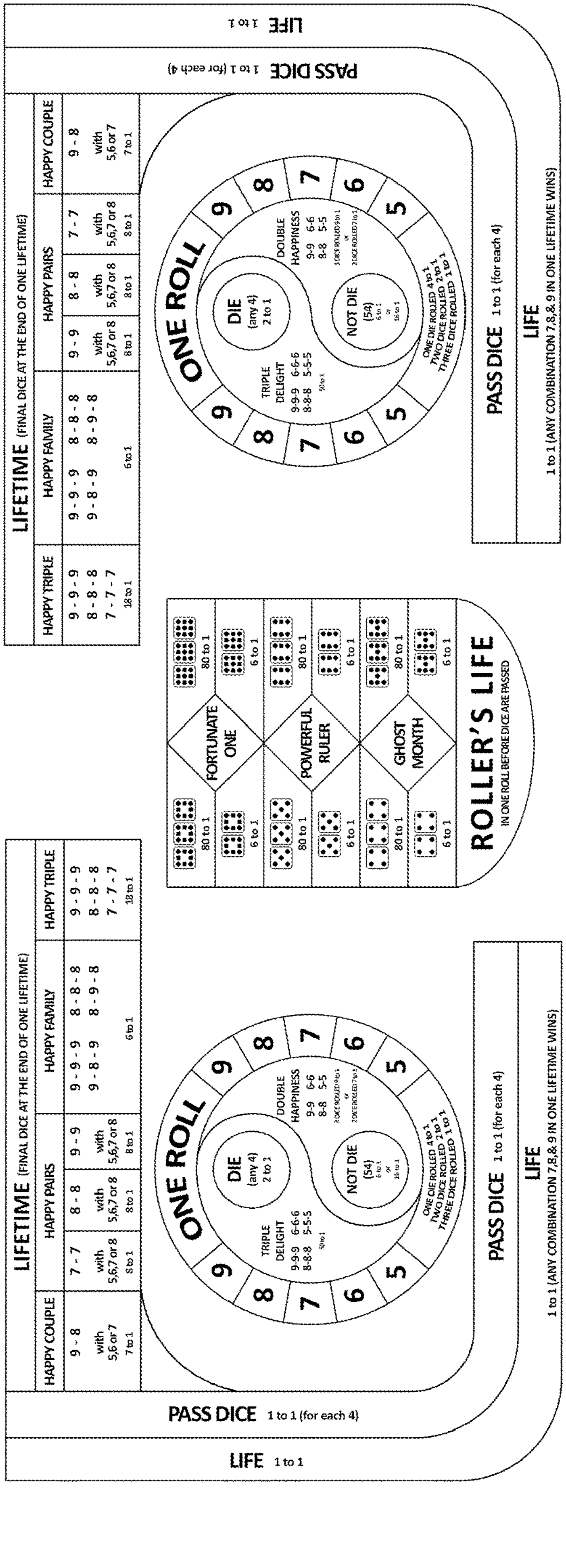
FIG. 6 is a top view of a table layout according to an embodiment of the present invention.

FIG. 6 shows the table felt in its entirety for the present invention. The outside area of the felt is the "Lifetime" bet area of the felt. These bets are all determined based on the current three results generations of a complete round of play. The Lifetime bet areas include Life, Happy Pairs, Happy Family, Happy Couples, and Happy Triples. In those areas of the felt, all bets are paid or lost at the end of each complete round of play, also known as a Lifetime. These bets must be placed before the first results generation of each Lifetime.

The inner circular area holds all the Single Roll bets: Die, Not Die, Double Happiness, Triple Delight, and 5, 6, 7, 8, and 9 single number wagers. These bets can be placed any time before any results generation and are determined on the outcome of one results generation.

The grid at the center of the felt contains the Roller's Life bets. These bets are on the outcome of each roll during single and contiguous complete rounds of play before a negative subset result occurrence. Bets must be placed before the first result generation and remain until a unprotected four or two fours, or a three fours or other negative subset results are generated.

In a table game embodiment of the invention, the game could operate as follows. Bets are placed on the board by players and player with dice is the Roller. Roller throws three six sided dice numbered four through nine up to three times. Roller rolls to attempt to get any winning combination of sevens, eights, or nines before any four is rolled. Rolled sevens, eights, and nines are removed from play on first and second rolls. Achieving a winning combination makes specific Lifetime bets pay and the Roller keeps the dice. Single Roll bets are paid with the outcome of each roll and placed again before each roll. Roller's Life bets pay when a specified result occurs with any single roll of the dice. Rolling a four ends the Roller's Lifetime except when a five is rolled with the four. Rolling a four without a five ends the Roller's Lifetime and the dice are passed to the next Roller. When rolling a five or six in the third roll, the Roller keeps the dice, but Lifetime bets lose with the exception of the Life bet which pushes. Players could use chips of differing denominations to place their bets or at the discretion of the house, different players could be assigned chips of a single designating color and denomination to differentiate the players' bets from each other.

A specified listing of game rules for a table game format could include the following:

1. Each player bets a minimum amount determined by the house.
2. Bets (Single Roll, Lifetime, Roller's Life) are placed on the table game board.
3 There are three (3) standard six (6) sided dice with each side having a different number of spots or number demarcation from four (4) to nine (9).
4. Three (3) such dice are rolled by one player called the "Roller". The Roller must place a "Life" bet or a "Pass Dice" bet in order to be eligible to roll the dice. The Roller can also choose to allow a companion roll the dice for him if he has a qualifying bet down.
5. The "Roller" gets the dice after all bets are placed. The Roller begins his first "Lifetime" and his "Roller's Life". A Lifetime is up to three (3) rolls of the dice. A Roller's Life is the Roller's entire turn before the dice are passed.
6. The number of spots or other number demarcation on the tops of the dice after the Roller throws the dice is considered the "roll" for the player.
7. Single Roll bets (see list below) are paid with the outcome of each single roll and are placed again before the next single roll.
8 Roller has three (3) attempts in a Lifetime to roll any combination or 7s, 8s, or 9s before any four (4) is rolled.
9. All 7s, 8s, and 9s that are rolled are removed from play after the first and second rolls and held to become part of the final outcome of the Lifetime roll.
10. Rolling a winning combination of 7s, 8s, or 9s in one (1), two (2), or three (3) rolls makes specific Lifetime bets pay and the Roller keeps the dice for another Lifetime.
11. Rolling a four (4) at any time ends the Roller's Lifetime except when any five (5) is rolled with any 4.
12. Rolling a four (4) without a five (5) ends the Roller's Lifetime and the roller must pass the dice on to the player immediately clockwise, who becomes the next Roller.
13. If the Roller rolls a five (5) or a six (6) during a third Lifetime roll, that Roller keeps the dice for another Lifetime.
14. Roller's Life bets are determined by the outcome of each roll during a Roller's full turn before the dice are passed. These bets remain in place until the Roller's Life ends. If a player wins a Roller's Life bet, he may remove the bet and payout and make a new bet.
15. The Roller's Life continues and the roller keeps the dice until a four (4) is rolled without a five (5) when the roller's turn.

16. When the roller rolls any four without a five the roller must pass the dice on to the player just clockwise, who becomes the new roller.

As discussed above, the specific numbers and number sets, as well as the positive, neutral, and negative sets may be changed in alternate optional embodiments. For example, in Japanese numerology, seven is considered a lucky number. To accommodate Japanese numerology, the number nine may be interchanged with the number seven in the betting structures and layout. Another embodiment of the invention is shown in Attachment A.

Other parts of East Asian numerology also hold the potential for game creation. For example, the Lo Shu Grid and its magic numbers have numerical, ranking, and spatial qualities that can be extrapolated into this or a game method. The Five Elements (wood, fire, Earth, metal, water) are endemic through Chinese culture and the elemental combinations provide the opportunity for the basis of a game or a game within the method herein. The examples given above using Chinese numerology, as well as variations based on other aspects of Chinese belief, provide a game that uses the tenets, beliefs, and rules of Chinese numerology, the believers' understandings of how numbers impact luck and life all around them, and aspects of Chinese language(s). The game rules are easy to understand for Chinese and other Asians as all game elements are common references and strong beliefs already endemic within the cultures.

This embodiment of the game is based on life as seen through Asian eyes. Life, death, longevity, riches, success, adversity, and even a loving wife or a happy family are all in the numbers and their rankings of subsets.

Results are randomly generated and players collect the riches and benefits their luck bestows by the numbers generated. Conversely players suffer adversity or metaphorical death from "unlucky" results.

The game (s and their wager (s are built to reflect the most beneficial aspects of numerology as winning results while the most negative aspects are losing results. Certain rare combinations or occurrences are at times denoted with pays that reflect their rarity.

Other elements within numerology may have both beneficial and negative connotations and thusly become relatively neutral in game play. Different elements, practices, and beliefs within numerology were reserved for a series of thematic games.

One optional format utilizes a walled, craps-sized table with a felt area for chip betting and the throwing of physical dice. This format could also include lighting from under the felt triggered by the entering of a roll's result by the table operator. Winning bets will light up to assist players in following game play and operators in making pays and collecting losses.

Other formats for the above game embodiment could also include hybrid table formats where the game play felt is simulated in a video screen for easy betting and the dice throwing is either real or simulated and craps-like tables without the lighting or electronic elements other than possible progressive jackpot meters with game operation provided by traditional croupiers.

Figure 7:
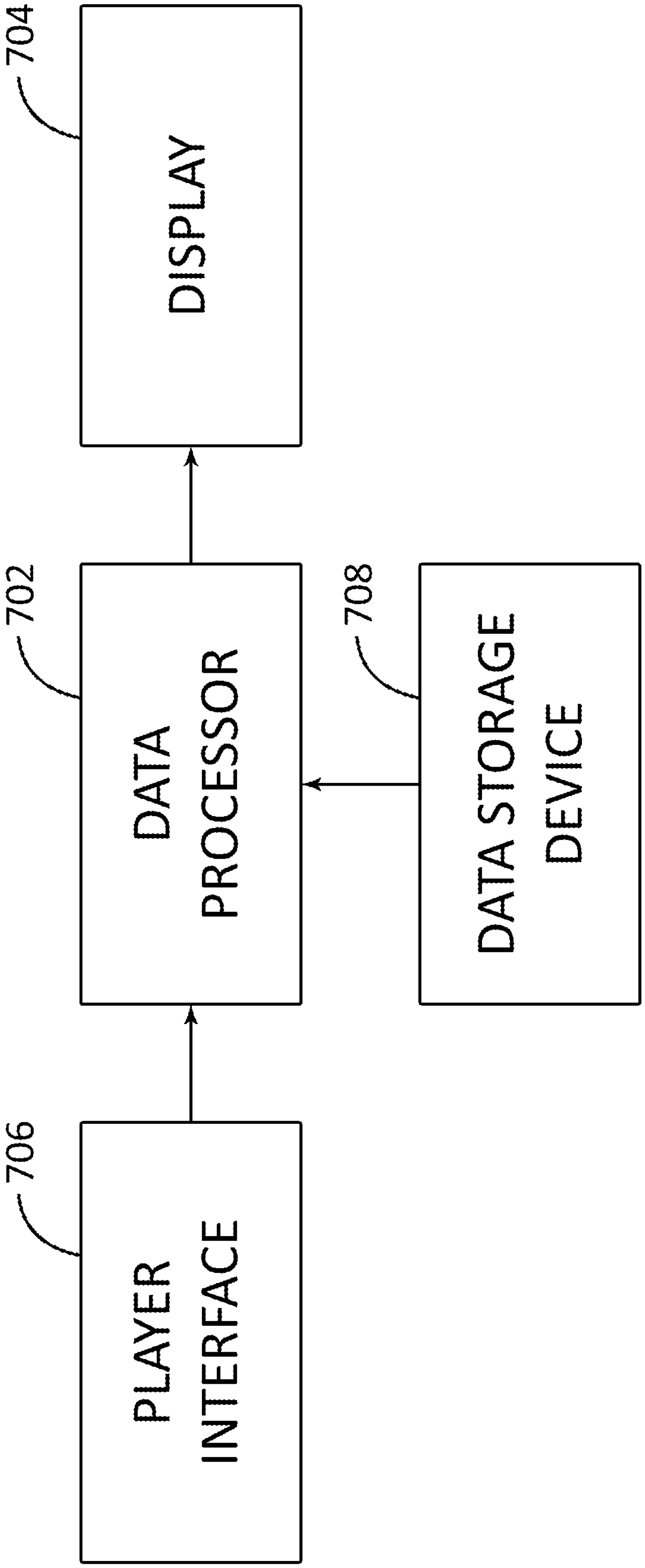
FIG. 7 is a block diagram of a device according to an embodiment of the present invention.

Referring to FIG. 7, one optional version of the present invention is conducted using a gaming device wherein the round outcomes are randomly produced electronically and represented upon video screens with animated dice or mechanically using physical dice that are randomized by a shaker, popper, blower, or the like. Animated dice and results generation could also include stand alone or group play gaming machines, smart phone applications, Internet usage, and other applicable electronic technologies.

More specifically, a gaming device may be provided with a data processor 702 in communication with a display 704, a player interface 706, and a data storage device 708. In one such optional embodiment, the data storage device 708 stores program instructions executable by the data processor 702 to conduct a wagering game method as described above. For example, wagers may be received through the player interface 706. In response to receipt of the wagers, the data processor 708 may conduct at least one round in which a round outcome is generated via a random outcome generator. In the example of a gaming device, the random outcome generator may include a software, firmware, or hardware random number generator that selects a random number or set of random numbers that are mapped to numbers of the number set or combinations of numbers of the number set to thereby produce a round outcome of numbers from the number set. The round outcome is optionally displayed at a display 704.

The data processor 702 determines whether the round constituted a final round due to a number form the negative set being generated, all the numbers of the round outcome being numbers from the positive set, or the quantity of rounds being completed. If the round is not a final round, numbers from the positive set are saved (and optionally displayed in a separate area) while numbers from the neutral set are regenerated. This process is repeated until a final round is completed and the game wagers are resolved. As discussed above, round wagers may likewise be offered, which are received and resolved with each round. Optionally, proposition wagers and multi-game wagers may also be offered as described above.

In an optional embodiment, the numbers are adjusted and grouped to specifically appeal to certain players who believe both four (4) and nine (9) are unlucky numbers. Having two (2) unlucky numbers within a six (6) member set made the game mathematics untenable. Therefore, the random number generating dice required alteration from the aforementioned embodiment. For this embodiment, the dice are altered to start at three (3), run through four (4), five (5), six (6), seven (7) and end at eight (8). The positive and neutral subsets have also been altered while the negative subset remains unchanged. The positive subset is three (3), five (5), seven (7), and eight (8). The negative subset is four (4). The neutral subset which negates the negative subset when rolled together is six (6). Gameplay is altered in this embodiment as the positive subset has an additional member. As there is additional member of the positive subset which is a condition that favors the player, the player is limited to only one (1) attempt per turn to achieve the desired outcome or relinquish control of the dice.

While certain embodiments of the present invention have been shown and described it is to be understood that the present invention is subject to many modifications and changes without departing from the spirit and scope of the claims presented herein.

The invention claimed is:

1. A method for conducting a wagering game utilizing a gaming table including a housing having a data input device, a display device, a memory, a random number generator and a processing device, the processing device being in communication with the random number generator, the memory and the display device and configured to actuate a random outcome generator formed by accessing the memory and configured to randomly generate a round outcome consisting of numbers selected from a predefined number set, the method comprising:

the random outcome generator defining a positive set, a neutral set, and a negative set, each of said positive set, neutral set, and negative set consisting essentially of numbers selected from said predefined number set, wherein all said numbers in said predefined number set are members of one, and only one, of said positive set, neutral set, or negative set;

the data input device receiving at least one game wager on the numbers generated by said random outcome generator over a quantity of rounds;

responsive to the data input device receiving the at least one game wager, the gaming table conducting said quantity of rounds, each round comprising:

randomly generating a round outcome by said random outcome generator;

the processor determining which of said positive set, neutral set, and negative set each of the numbers within said round outcome fall into;

the processor terminating said quantity of rounds if any of said numbers within said round outcome fall within said negative set;

the processor storing in the memory any numbers within said positive set and reducing the quantity of numbers generated in the ensuing round outcome by the quantity of stored numbers; and the gaming table conducting additional rounds within said quantity of rounds until a final round of said quantity of rounds has been conducted or a number within said round outcome falls within said negative set, whichever occurs first, wherein in said additional rounds, said random outcome generator is configured to only reselect numbers falling within said neutral set; and the processor resolving said game wagers after said final round based on the numbers stored from the quantity of rounds plus any numbers selected in said final round.

2. The method of claim 1 wherein each round further comprises: receiving at least one round wager; and resolving said round wager based on the numbers within said round outcome.

3. The method of claim 1 wherein said quantity of rounds is a number from one to four.

4. The method of claim 1 wherein said round outcome consists of three numbers.

5. The method of claim 1 wherein said predefined number set includes said positive set of one to four numbers, said neutral set of one to four numbers, and said negative set of one to four numbers, wherein the total combined numbers of said positive, neutral and negative sets is six numbers.

6. The method of claim 1 further comprising:

defining a neutral combination comprising a number from said negative set and at least one additional number; and continuing to conduct said quantity of rounds rather than terminating said quantity of rounds when said neutral combination occurs.

* * * * *